United States Patent [19]

Bailey et al.

[11] Patent Number: 4,777,231

[45] Date of Patent: Oct. 11, 1988

[54] PROCESS TO PRODUCE WATER ABSORBENT POLYMERS

[75] Inventors: Kristy M. Bailey, Naperville; Jeffrey R. Cramm, Winfield, both of Ill.

[73] Assignee: Nalco Chemical Company, Naperville, Ill.

[21] Appl. No.: 117,789

[22] Filed: Nov. 6, 1987

[51] Int. Cl.$^4$ .............................................. C08F 2/00
[52] U.S. Cl. .................................. 526/203; 526/273; 526/295; 526/317.1; 526/930
[58] Field of Search ....................................... 526/203

[56] References Cited

U.S. PATENT DOCUMENTS

| | | | |
|---|---|---|---|
| 3,729,451 | 4/1973 | Blecke et al. | 526/203 |
| 4,093,776 | 6/1978 | Aoki et al. | 428/402 |
| 4,339,371 | 7/1982 | Robinson et al. | 524/310 |
| 4,367,323 | 1/1983 | Kitamura et al. | 524/460 |
| 4,446,261 | 5/1984 | Yamasaki et al. | 524/40 |
| 4,465,803 | 8/1984 | Nakayama | 524/460 |

FOREIGN PATENT DOCUMENTS 2062807  3/1987  Japan ................. 526/203

Primary Examiner—Joseph L. Schofer
Assistant Examiner—J. M. Reddick
Attorney, Agent, or Firm—John G. Premo; Anthony L. Cupoli; Donald G. Epple

[57] ABSTRACT

A water-in-oil suspension polymerization process of the type comprising a process for preparing a water-insoluble polymer capable of absorbing water, aqueous salt solutions and blood, which utilizes as the suspending agent a cellulose ester or ether protective colloid, the improvement which comprises using as the protective colloid an oil-soluble, water-insoluble, polymeric surfactant instead of the cellulose derivatives, in an amount sufficient to stabilize the emulsion, said polymeric surfactant having the formula:

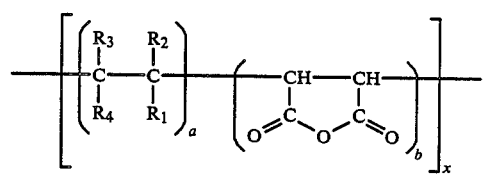

wherein x is a whole number greater than about 5, the mole ratio of a:b is from 3:1 to 1:3, provided the HLB number is maintained at less than about 14, $R_1$, $R_2$, $R_3$ and $R_4$ are independently selected from the group consisting of hydrogen, alkyl ($C_{1-16}$), aryl ($C_{6-12}$), alkaryl ($C_{7-12}$), and $R_1$, $R_2$, $R_3$, and $R_4$ are such that the surfactant is oil-soluble and water-insoluble.

1 Claim, No Drawings

PROCESS TO PRODUCE WATER ABSORBENT POLYMERS

INTRODUCTION

Water absorbent polymers may be conveniently produced using the teachings of U.S. Pat. No. 4,446,261, the disclosure of which is incorporated herein by reference.

The process described by the patentees is done so in the following language:

"As the properties ordinarily required for a water-absorbing materials, there can be mentioned (1) a large absorbent capacity, (2) a high absorbency rate, (3) a high gel strength after absorption of water and (4) a good shape-retaining property. Only a material having all of the above properties can be regarded as a satisfactory water-absorbing material.

"Water-absorbing materials prepared according to the process disclosed in Japanese Patent Publication No. 30710/79 are still defective in various points.

"Since a sorbitan fatty acid ester is used as a protecting colloid in the W/O suspension polymerization process, the particle size of the obtained polymer is very fine and smaller than 100 um. A special measure should be taken for preventing dusting when the resulting powder is handled. Furthermore, when the powder is contacted with an aqueous liquid, formation of a difficult-to-dissolve lump of the powder is readily caused and hence, the water-absorbing speed is very low.

"We made researches with a view to developing a water-absorbing material having all of the above-mentioned properties while eliminating the foregoing defects, and we found that in the W/O suspension polymerization process comprising dispersing and suspending an aqueous solution of a monomer containing a small quantity of a crosslinking agent in a hydrophobic liquid and conducting polymerization, when a cellulose ester or cellulose ether which is oil-soluble at the polymerization temperature is used as the protecting colloid and a hydrocarbon or a halogenated aromatic hydrocarbon is used as the solvent, the particle size of the obtained polymer is large and exceeds 100 um and a water-absorbing material having a high absorbent capacity and a high absorbency rate can be obtained. We have now completed the present invention based on this finding." (end quote)

THE INVENTION

The invention comprises a water-in-oil suspension polymerization process of the type comprising a process for preparing a water-insoluble polymer capable of absorbing water, aqueous salt solutions and blood, which utilizes as the suspending agent a cellulose ester or ether protective colloid, the improvement which comprises using as the protective colloid an oil-soluble, water-insoluble, polymeric surfactant instead of the cellulose derivatives, in an amount sufficient to stabilize the emulsion, said polymeric surfactant having the formula:

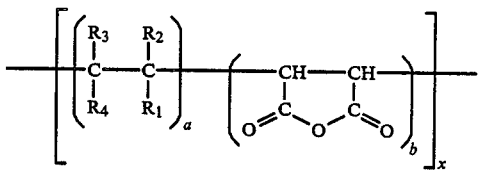

wherein x is a whole number greater than about 5, the mole ratio of a:b is from 3:1 to 1:3, provided the HLB number is maintained at less than about 14, $R_1$, $R_2$, $R_3$ and $R_4$ are independently selected from the group consisting of hydrogen, alkyl ($C_{1-16}$), aryl ($C_{6-12}$), alkaryl ($C_{7-12}$), and $R_1$, $R_2$, $R_3$, and $R_4$ are such that the surfactant is oil-soluble and water-insoluble.

The suspending agents used in the process of this invention are the subject of U.S. Pat. No. 4,339,371, the disclosure of which is incorporated herein by reference. The patentee describes the suspending agents as a "polymerized surfactant" in the following language:

"The oil-soluble, water-insoluble polymerized surfactant of the present invention has the general formula:

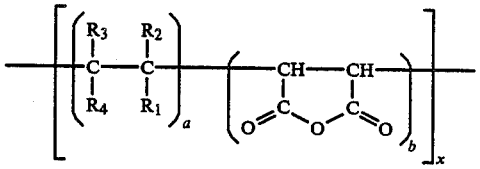

wherein x is a whole number greater than about 5, the mole ratio of a:b is from 3:1 to 1:3, provided the HLB number is maintained at less than about 14, preferably less than about 10; and $R_1$, $R_2$, $R_3$ and $R_4$ are each independently hydrogen, alkyl ($C_{1-48}$), alkoxy ($C_{1-48}$), alkenyl ($C_{2-48}$), aryl ($C_{6-12}$) or alkaryl ($C_{7-12}$) with the proviso that $R_1$, $R_2$, $R_3$ and $R_4$ are such that the polymeric surfactant is oil-soluble and water-insoluble.

"Preferred surfactants correspond to the above formula wherein x is about 100 to 400, the ratio of a:b is about 1:1, $R_1$, $R_2$ and $R_3$ are hydrogen and $R_4$ is $C_{16}H_{33}$ or $C_{12}H_{24}$.

"The polymeric surfactant may be prepared in any suitable manner, generally by reacting maleic anhydride with an appropriate comonomer. Such preparation may, for example, be conducted in the manner disclosed in U.S. Pat. No. 3,732,337, which is incorporated herein by reference. It is to be noted, however, that the particular method of preparing the polymeric surfactant does not constitute a feature of this invention. Such a material is available as, for example, PA-18 or PA-14 from Gulf." (end quote)

Of the various polymeric surfactants described in U.S. Pat. No. 4,339,371, the preferred are the PA-14 which is tetradecene co-maleic anhydride and PA-18 which is an octadecene maleic anhydride copolymer.

The molecular weights of the PA-14 and PA-18 copolymers as determined by GPC have weight average molecular weights of 56,000 and 36,500, respectively. The number average molecular weights were 9,700 and 10,500. The weight average molecular weight of the polymers should generally be within the range of between 20,000–80,000. Copolymers made from a mixture of $C_{10}$-$C_{18}$ olefins maleic anhydride have weight average molecular weight of 15,500 and number average molecular weight of 3,750 do not perform well in the practice of the invention.

The solvents used in the polymerization process must be one capable of undergoing azeotropic distillation with water. Examples of such solvents are hexane, toluene and the like. While certain chlorinated solvents also undergo azeotropic distillation, they are least preferred. Therefore, its the hydrocarbon solvents that are capable of being azeotroped at temperatures below the decomposition of the polymers that are preferred.

To illustrate the invention, the following are presented by way of example:

EXAMPLE I

15% Solids/Continuous Addition of Monomer/PA-14

521.7 g of heptane and 5.6 g of PA-14 (poly tetradecene-maleic anhydride) were charged to a 2-liter resin flask equipped with a 5-neck resin head, a thermometer, nitrogen purge tube, Dean-Stark trap, reflux condenser, and mechanical stirrer. Agitation was started, and the mixture was heated to 65° C. with nitrogen purging.

The monomer phase was prepared by slowly adding 176.0 g of 24.4 percent sodium hydroxide solution to 96.4 g of acrylic acid. Ice bath cooling was used to maintain less than 40° C. during the neutralization. Then, 0.27 g of ammonium persulfate was added to the monomer solution. The concentration of monomer in the resulting aqueous phase was 44 weight percent.

The monomer phase was pumped into the hot, stirred oil phase over a period of 70 minutes. The reaction mixture was heated or cooled as necessary to maintain 65° C. After the monomer addition was completed, the polymerization mixture was heated to boiling, and 120 ml of water were removed by azeotropic distillation. During this process the water and hydrocarbon solvent were separated, and the heptane was continuously returned to the reactor. Filtration and air-drying to remove the heptane gave discrete, free-flowing polymer beads. The product was dried under vacuum at 80° C. to reduce the final volatiles content to less than 5 percent. The polymer absorbed 52 ml/g of 1 percent saline.

EXAMPLE II

High Solids/Continuous Addition of Monomer/Cross-linked/PA-14

246.6 g of heptane and 8.0 g of PA-14 were charged in a 2-liter resin flask equipped as in Example I. Agitation was started, and the mixture was heated to 65° C. with nitrogen purging. To prepare the monomer phase, 127.88 g of 50.1% sodium hydroxide was added to 128.25 g of deionized water. Using ice bath cooling to maintain less than 40° C., 142.71 g of acrylic acid was then added slowly. After the neutralization was completed, 4.36 g of 1.0 weight percent methylene bisacrylamide in water and 0.40 g of ammonium persulfate were added and dissolved. The monomer was pumped into the hot, stirred oil phase at a rate of 200 ml/hr. The polymerization mixture was heated or cooled as necessary to maintain 65° C. After the addition of monomer was completed, the polymer suspension was heated to boiling, and 180 ml of water were removed by azeotropic distillation. During this process the water and hydrocarbon solvent were separated, and the heptane was continuously returned to the reactor. Filtration and air-drying to remove the hydrocarbon solvent gave discrete, free-flowing polymer beads. The product was dried under vacuum at 80° C. to reduce the final volatiles content to less than 5 percent. The resulting polymer absorbed 50 ml/g of 1 percent saline solution.

EXAMPLE III

Continuous Addition of Monomer/PA-18

421.7 g of cyclohexane and 5.6 g of PA-18 (poly octadecene-maleic anhydride) were charged in a 2-liter resin flask equipped as in Example I. Agitation was started, and the mixture was heated to 65° C. with nitrogen purging. The monomer phase was prepared by first adding 86.4 g of 50.1 percent sodium hydroxide to 89.6 g of deionized water and then slowly adding 96.4 g of acrylic acid with ice bath cooling to maintain less then 40° C. Then, 0.27 g of ammonium persulfate was added and dissolved with stirring at ambient temperature.

The monomer phase was pumped into the hot, stirred oil phase over a period of 70 minutes. The polymerization mixture was heated or cooled as necessary to maintain 65° C. The polymer suspension was then heated to boiling, and 120 ml of water were removed by azeotropic distillation. During this process the water and hydrocarbon solvent were separated, and the cyclohexane was continuously returned to the reactor. Filtration, drying at 80° C. under vacuum, and grinding gave free-flowing polymer beads. The product was dried under vacuum at 80° C. to reduce the final volatiles to less than 5 percent. The resulting polymer absorbed 43 ml/g of a 1 percent saline solution.

EXAMPLE IV

Batch Reaction/PA-18/Cross-Linked with BDDGE 568.0 g of heptane and 5.0 g of PA-18 were charged to a 2-liter resin flask equipped as in Example I, and agitation was started. The monomer phase was prepared by first adding 91.0 g of 50 percent sodium hydroxide to 111.41 g of deionized water and then adding 105.0 g of acrylic acid with ice cooling to maintain less than 40° C. The monomer phase was then added to the stirred oil phase, followed immediately by a solution of 0.35 g of potassium persulfate in 7.0 g of deionized water. The resulting mixture was heated to 55° C., and nitrogen purging was then started. The polymerization mixture was allowed to exotherm. Following the exotherm the polymer suspension was held at 60°-65° C. for 60 minutes. A solution of 0.3 g 1,4-butanediol diglycidyl ether in 10.0 g of deionized water was then added. The suspension was heated to boiling, and 138 ml of water were removed by azeotropic distillation. During this process the water and hydrocarbon solvent were separated, and the heptane was continuously returned to the reactor. Filtration and drying at 80° C. under vacuum gave an absorbent polymer in the form of small, discrete beads. The polymer absorbed 52 ml/g of a 1 percent saline solution.

EXAMPLE V

30% Solids/Continuous Addition of Monomer/PA-14

Polymerization was conducted in the same manner as in Example II except 406 g heptane, 8.0 g PA-14, 183 g of 51% sodium hydroxide, 193 g deionized water, 210 g acrylic acid, and 0.6 g of potassium persulfate were used. Monomer addition took 140 minutes. 250 ml of water were removed by azeotrope distillation. The resulting polymer absorbed 63 ml of 1.6% saline solution per gram of dry polymer.

EXAMPLE VI

Continuous Addition of Monomer/Highly Crosslinked/PA-14

Polymerization was conducted in the same manner as in Example II except 406 g heptane, 8.0 PA-14, 146 g of 51% sodium hydroxide, 154 g deionized water, 168 g acrylic acid, 0.16 g methylene bisacrylamide, and 0.48 g potassium persulfate were used. Monomer addition took 115 minutes. 200 ml of water were removed by azeotrope distillation. The resulting polymer absorbed 38 ml of 1.6% solution per gram of dry polymer.

Having thus described our invention, we claim:

1. A water-in-oil suspension polymerization process comprising a process for preparing a water-insoluble polymer capable of absorbing water, aqueous salt solutions and blood, which utilizes as a suspending agent a protective colloid, the improvement which comprises using as the protective colloid an oil-soluble, water-insoluble, polymeric surfactant in an amount sufficient to stabilize the emulsion, said polymeric surfactant having the formula:

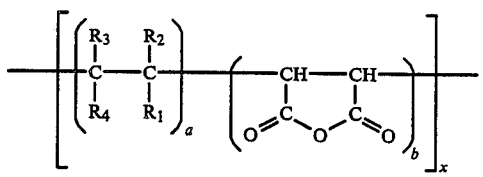

wherein x is a whole number greater than about 5, the mole ratio of a:b is from 3:1 to 1:3, provided the HLB number is maintained at less than about 14, $R_1$, $R_2$, $R_3$ and $R_4$ are independently selected from the group consisting of hydrogen, alkyl ($C_{1-16}$), aryl ($C_{6-12}$), alkaryl ($C_{7-12}$), and $R_1$, $R_2$, $R_3$, and $R_4$ are such that the surfactant is oil-soluble and water-insoluble.

* * * * *